United States Patent
Niemi

(10) Patent No.: US 6,381,630 B1
(45) Date of Patent: Apr. 30, 2002

(54) COMPUTER SYSTEM AND METHOD FOR CHARACTERIZING AND DISTRIBUTING INFORMATION

(75) Inventor: Frederick Eldin Niemi, Cary, NC (US)

(73) Assignee: Cisco Technology, Inc., San Jose, CA (US)

(*) Notice: Subject to any disclaimer, the term of this patent is extended or adjusted under 35 U.S.C. 154(b) by 17 days.

(21) Appl. No.: 09/660,689

(22) Filed: Sep. 13, 2000

Related U.S. Application Data

(63) Continuation of application No. 09/104,558, filed on Jun. 25, 1998, now Pat. No. 6,144,987.

(51) Int. Cl.[7] .............................................. G06F 15/16
(52) U.S. Cl. ........................ 709/201; 409/205; 409/224
(58) Field of Search ................................. 709/223–225, 709/201, 205, 224; 370/245; 707/10; 710/52

(56) References Cited

U.S. PATENT DOCUMENTS

| | | | |
|---|---|---|---|
| 4,750,175 A | 6/1988 | Brenneman et al. | |
| 5,568,471 A | * 10/1996 | Hershey et al. | 370/245 |
| 5,655,081 A | 8/1997 | Bonnell et al. | |
| 5,758,083 A | * 5/1998 | Singh et al. | 709/223 |
| 5,805,820 A | * 9/1998 | Bellovin et al. | 709/225 |
| 5,826,269 A | * 10/1998 | Hussey | 707/10 |
| 5,867,659 A | * 2/1999 | Otteson | 709/224 |
| 5,881,315 A | * 3/1999 | Cohen | 710/52 |
| 6,182,119 B1 | 1/2001 | Chu | |

* cited by examiner

Primary Examiner—David Wiley
(74) Attorney, Agent, or Firm—A. Sidney Johnston; Cesari and McKenna, LLP

(57) ABSTRACT

A system enables a consumer to generate a filtering program based on criteria set forth by a system operator during run time. During system operation, the operator selects appropriate filtering criteria from a display screen associated with a respective consumer. Each consumer implements filtering criteria in a filtering program that is registered with a distributor. The filtering program may include simple true or false tests, or more complex tests. The distributor compiles each filtering program during registration and thereafter dynamically loads the compiled program before executing filtering queries.

18 Claims, 3 Drawing Sheets

| Message type 302 | Argument 1 304 | ... | Argument N 306 |

Boolean Expression

```
If (msg.data1 = 42 AND msg.data2 = 46 then
      return true;
else
      return false;
```

Fig. 4-A

SQL Expression

```
evaluateMsg(msg)
{
      If (msg.data1 .EQ. 42 AND msg.data2 .LE. 46 )
      then
            return true;
      else
            return false;
}
```

Fig. 4-B

FILTERING PROGRAM

```
int num_msgs = 0;
evaluateMsg(msg)
{
      If(msg.data1 == 42)
      {
            num_msgs++;
            If(num_msgs = 5)
            {
                  num_msgs = 0;
                  return true;
            }
      }
      return false;
}
```

Fig. 4-C

COMPUTER SYSTEM AND METHOD FOR CHARACTERIZING AND DISTRIBUTING INFORMATION

This application is a continuation of Ser. No. 09/104,558 Jun. 25, 1998 U.S. Pat. No. 6,144,987.

FIELD OF THE INVENTION

This invention relates to network management applications that manage network devices and specifically to filtering expressions that characterize messages accepted by network management applications.

BACKGROUND OF THE INVENTION

Computer networks, to which this invention applies, are systems comprising a number of components such as printers, computers, routers and the like, that are connected to enable communication among the components and sharing of data and resources. For example, a computer network system may include a server that provides shared resources to network users, one or more clients that access shared network resources provided by the server, a physical medium that connects the network computers, and shared data and resources. In order for a computer network system to operate efficiently, a system administrator must constantly monitor and manage each network component. The system administrator generally manages the network by performing the following management tasks: user administration for creating, maintaining and securing user accounts; resource management for implementing and supporting network resources; configuration management for planning, expanding, and maintaining configuration; performance management for monitoring and tracking network activity to maintain and enhance the network's performance; and network maintenance for preventing, detecting and solving network problems. To perform these management tasks effectively, the system administrator must receive timely and accurate information about the state of each network component.

Therefore, the states of network components are constantly monitored by software applications known as "producers". Producers generate error messages or alarm messages when they detect anomalies, i.e. any condition that is not expected. Examples of producers include a router that generates a "trap", i.e. an error message, whenever it detects an anomaly in a network device and a poller which is a software application that polls the network for data and generates an error or informational message whenever an anomaly is found. Messages from the producers are transmitted to a distributor for further transmission to the appropriate network client or consumer. The distributor is a software application that queues incoming messages from producers and transmits each message to the consumers that request that message. Consumers are software applications that display to the system administrator errors or alarms generated by the producers and they may also perform various functions for correcting the reported anomaly. An example of a consumer is a desktop application that displays a network map displaying the location of each anomaly. Each consumer may be dedicated to reporting and correcting specific network anomalies. Thus when the distributor distributes a message from the producer, it sends the message to only those consumers that requested messages of those anomalies.

After the network starts up, each consumer in the network registers with the distributor. The registration information from each consumer includes filtering expressions that are stored in the distributor's registration list; the filtering expressions are used by the: distributor to determine which consumer(s) requested the incoming message for each message type. The filtering expressions are dynamic and may be changed by the system administrator or they may be changed when the consumer detects certain error and/or anamoly conditions. Currently, the filtering expressions are Boolean statements and/or SQL (query) statements which are evaluated by the distributor every time the distributor receives an incoming message. Upon evaluating a message, if a filtering expression is true, the distributor sends the message to the consumer associated with that filtering expression.

Although simple filtering expressions using Boolean or SQL statements are easy to develop, complex filtering expressions using these statements are more difficult to develop. An example of a complex filtering expression is one where the consumer requests only a sampling of error messages from a specific device. Moreover, the SQL and Boolean expressions must be translated into the programing language of the distributor each time they are evaluated, i.e. whenever a new message is received from a producer. Each translation consumes processing time and hinders the performance of the distributor.

SUMMARY OF THE INVENTION

We have created a system whereby each consumer generates a filtering program based on criteria set forth by the system operator during run time. While the network system is operating, the system administrator selects the appropriate filtering criteria from display screens associated with the respective consumers. Each consumer implements its filtering criteria in a filtering program and registers the filtering program with the distributor. Each consumer may also dynamically alter its filtering program during run time when it detects certain error and/or alarm conditions. This allows the consumer to determine and display the root causes of problem(s) being solved on the system and it allows the consumer to determine when a problem has been rectified. With this arrangement, the filtering programs may include simple true or false tests or they may include is more complex tests that cannot be implemented using simple Boolean or SQL statements. This provides an environment in which the system operator can effectively narrow the filtering criteria for each consumer and thereby reduce consumer processing of unwanted messages.

Specifically in the preferred embodiment of the invention, the distributor compiles each filtering program provided by each consumer when the consumer registers with the distributor. Unlike Boolean and SQL statements that cannot be translated into the distributor's native language and that must be interpreted each time a query is performed on an incoming message, the filtering programs are written and compiled in the same high level programming language as the distributor. Thereafter, the distributor dynamically loads the compiled filtering programs before executing the filtering queries. Since the distributor does not have to interpret the filtering programs upon receiving each incoming message, it processes and distributes the message faster than the prior distributors that executed Boolean and SQL statements.

BRIEF DESCRIPTION OF THE DRAWINGS

The above and further advantages of the invention may be better understood by referring to the following description in conjunction with the accompanying drawings in which like reference numbers indicate identical or functionally similar elements:

FIG. 4-A illustrates filtering expressions in a Boolean statement;

FIG. 4-B illustrates filtering expressions in a SQL statement; and

FIG. 4-C illustrates filtering expressions in a filtering program.

DETAILED DESCRIPTION OF AN ILLUSTRATIVE EMBODIMENT

Figure 1:
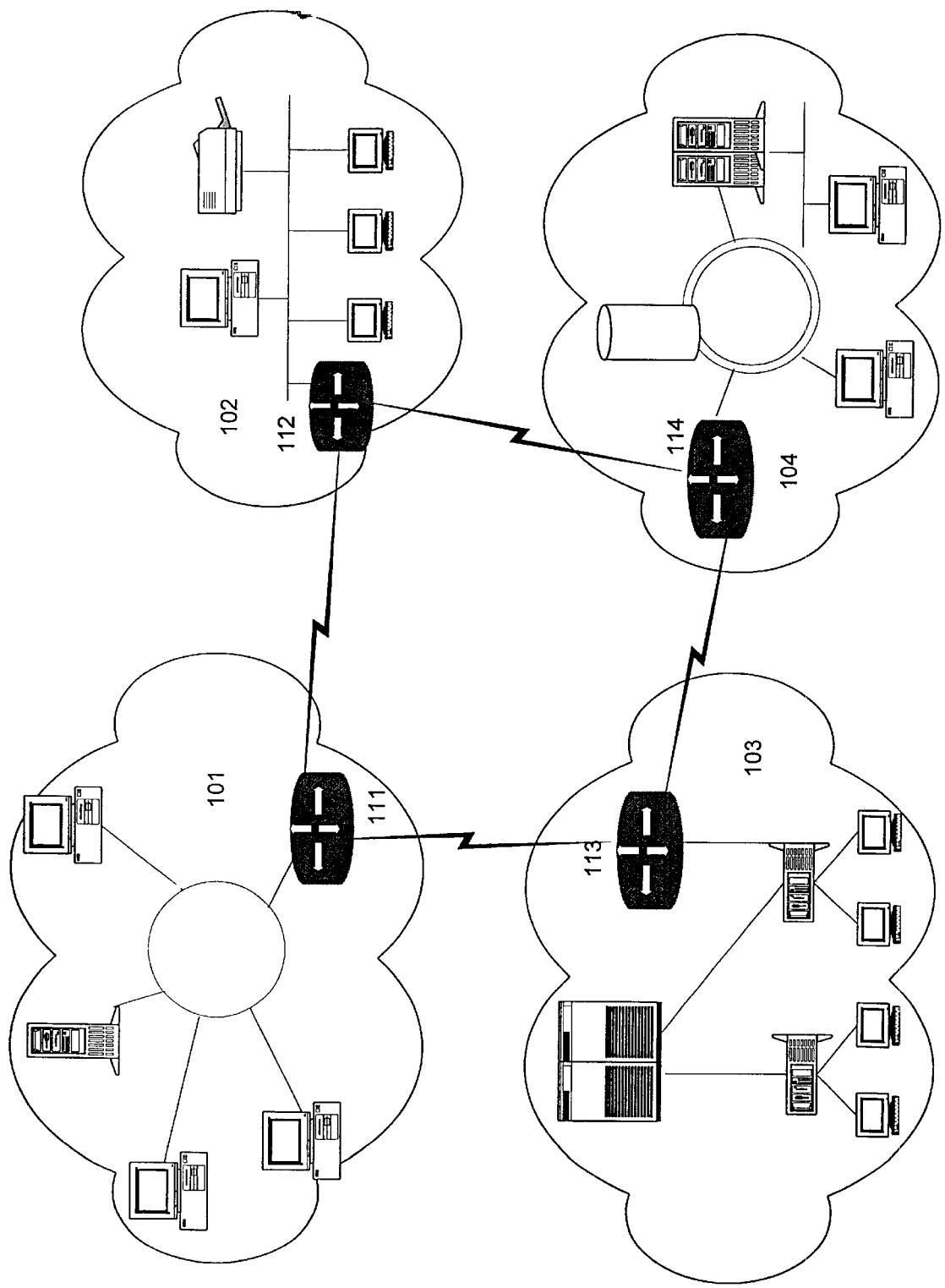
FIG. 1 is a diagram of a network management system incorporating the invention.

FIG. 1 is a schematic diagram of a distributed network management system that is configured to share resources and data in accordance with the present invention. The illustrated system is a combination of four separate local area networks (LAN) 101–104 that are interconnected into a wide area network (WAN) to form a single distributed network structure. Each LAN 101–104 may include servers and clients that are connected by physical media such as cables and network cards in order to share resources such as files or applications. A server is a computer that provides shared network resources to network users and a client is a computer that accesses the shared network resources provided by the servers. Shared resources in a network may include printers and other peripherals and software applications. The LANs 101–104 are interconnected to communicate with each other by routers 111–114. Routers exchange protocol-specific information between separate networks, determine the best path for sending data and filter broadcast traffic to local segments of the network structure.

In order to effectively manage a distributed network system, the system administrator must perform user administration, configuration management, performance management and maintenance. Timely and accurate information about the states of each network's component is required for the system administrator to perform the necessary network management functions. Therefore, the states of these network components are consistently monitored by a reporting structure which includes producers which generate error and alarm messages and a distributor which transmits these messages to consumers which display the messages to the system operator.

Figures 2, 3:
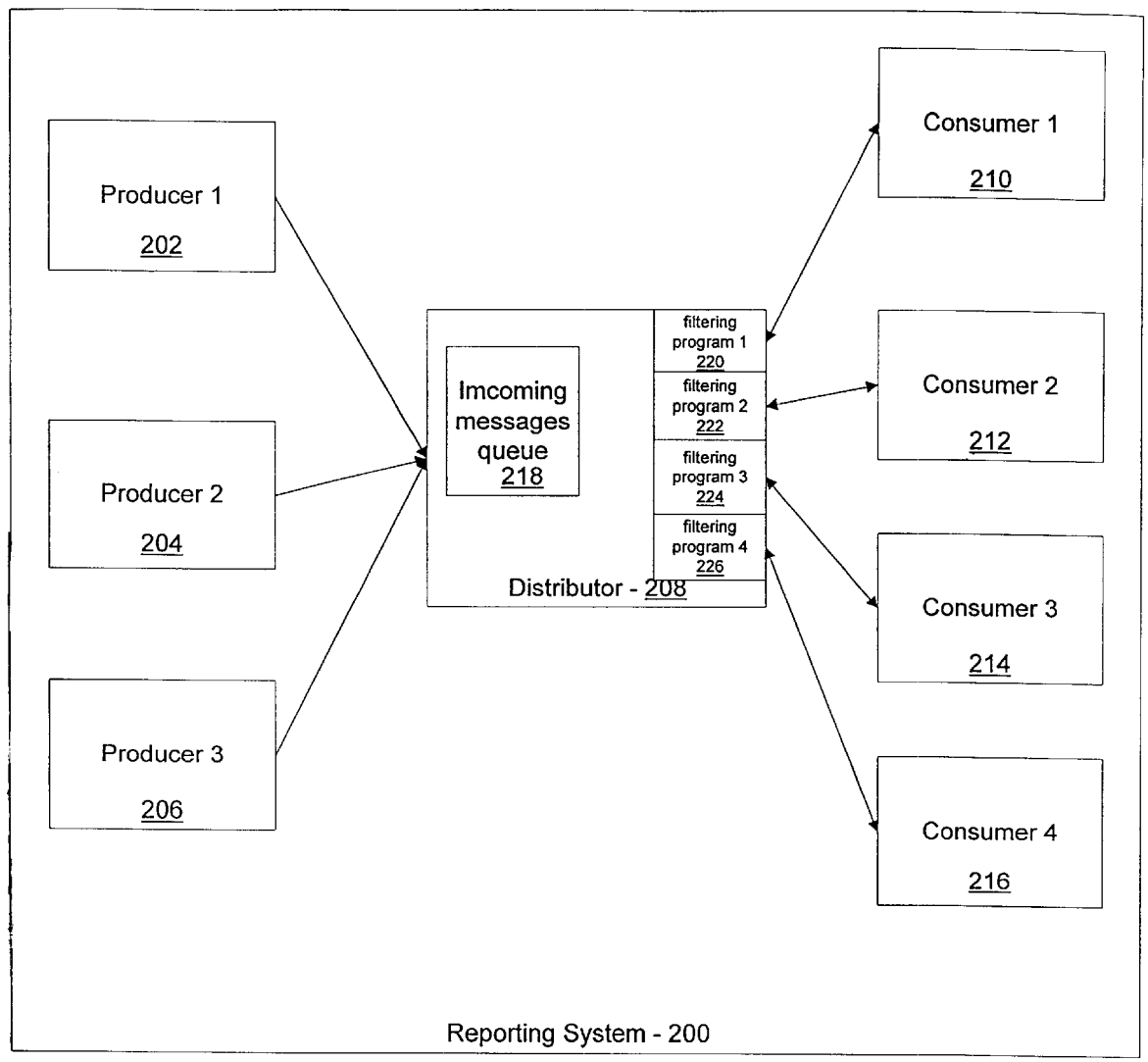
FIG. 2 is a schematic diagram of the network management applications and how they interact with each other and with the distributor application.
FIG. 3 illustrates a message from the producer to the distributor.

The illustrative reporting structure 200 shown in FIG. 2 includes three producers 202–206, a distributor 208, and four consumers 210–216. Producers 202–206 are software applications that constantly check the states of network components and produce error and/or alarm messages whenever they detect anomalies. The distributor 208 is a software application which queues messages from producers 202–206 and transmits them to the appropriate network client or consumer 210–216. In the present invention, the distributor 208 is developed in a high level programming language such as JAVA. Consumers 210–216 are software applications that display to the system administrator error or alarm messages of network anomalies.

In accordance with the present invention, when a producer 202–206 detects an anomaly, it generates a message and transmits the message to the distributor 208. The message is stored in the distributor's queue 218. Thereafter, the distributor 208 executes filtering programs 220-226 received from the consumers 210–216, respectively, to determine which of the consumers are to receive the message. If the test from the filtering expressions in a consumer's filter program is true, the distributor 208 forwards the message to that consumer. The consumer then displays the message to the system operator and/or takes other action to correct the anomaly as directed by the system operator.

After the network starts up, each consumer 210–216 enables the system administrator to create filtering expressions through its graphical user interface. While the network system is operating, the system administrator chooses the appropriate filtering criteria from the consumer's display screen. Each consumer 210–216 implements the filtering expressions as a filtering program 220–226 and registers the filtering program with the distributor 208. Each consumer may also dynamically alter it's filtering program during run time if it detects certain error and/or alarm conditions. This enables the consumers to determine and display the root causes of the problems being solved and it enables the consumers to determine when a problem has been rectified. The filtering programs 220–226 are preferably implemented in the same high level programming language as the distributor. The programs may include simple true or false tests or they may include more complex tests that cannot be implemented using Boolean or SQL statements. The filtering programs 220–226 from each consumer are stored in the distributor's registration list and they are used by the distributor to determine which consumers should receive each incoming message.

Specifically in the preferred embodiment of the invention, the distributor 208 compiles each program 220–226 sent from each consumer 210–216 when the consumer registers with the distributor. The filtering programs are preferably compiled in the same native language as the distributor's software application. Thereafter, the distributor 208 dynamically loads the compiled filtering programs 220–226 prior to executing the filtering queries. Since the distributor does not have to interpret the filtering programs upon receiving each incoming message, it executes the message queries faster than distributors that execute Boolean and/or SQL statements.

FIG. 3 is a schematic block diagram depicting the format of a message 300 that is generated by a producer 202–206 and sent to the distributor 208 for transmission to the appropriate consumer(s) 210–216. The message includes a message type 302 identifying the type of message and arguments 304–306 whose values are tested to determine whether a message should be sent to a consumer. Messages from different producers contain different arguments. For example, a message about whether data throughput has exceeded its threshold would contain the current data throughput value but not a status value, whereas, a message about a router's status would contain the status value but it may not contain the data throughput value.

Prior distributors either need to know all of the different message formats that are available for processing in order to examine them or they may execute complex, time-consuming algorithms to determine if a message contains the argument(s) the consumer is interested in. The algorithms then extract the values of those arguments and examine the values. If new message formats with new arguments are introduced, the distributors may have to be updated in order to process the new arguments. In the present invention filters are created at run time. Therefore, new message formats with new arguments can be introduced at anytime without updating the distributor. Additionally, higher level programming languages enable definitions of data structures that match the new message formats and they enable casting of the new messages to these new data structures. Thus, the filters do not have to examine the messages if the desired arguments actually exist in the messages. The filters in the current invention are therefore a lot faster than algorithms used in prior distributors.

FIGS. 4-A to 4-C illustrate filtering expressions executed on the message of FIG. 3. The filtering expressions in FIGS. 4-A to 4-C are implemented in accordance with a Boolean statement, a SQL statement and a filtering program respectively. Boolean expressions are useful for comparing values or performing true and false tests. FIG. 4-A is an example of a Boolean statement that compares two values. The first part of the Boolean expression tests to see if "data 1" in the message is equal to 42 and the second part tests to see if a secondary argument "data2" is equal to 42. If both expressions in the Boolean statement are true, the distributor 208 transmits the message to the consumer 210–216 that registered the statement.

FIG. 4-B is an example of a SQL statement. SQL statements are also useful for comparing values and performing other filtering tests. However, SQL statements cannot perform complex filtering tests on statements that are analyzed individually and that are not stored in a database. The first expression in the illustrative SQL statement tests whether the value of data1 is equal to 42 and the second expression tests to see if the value of data2 is less than or equal to 46. If both expressions in the SQL statement are true, the distributor 208 transmits the message to the consumer 210–216 that registered the statement.

FIG. 4-C is an example of a filtering program. Filtering programs can perform complex queries on individual messages or on groups of messages. The example in FIG. 4-C transmits only the 5th message where the value in data1 is equal to 42.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A distributed computer network system comprising:
   a distributor that receives a generated message from an entity that detects an anomaly on a network device;
   a filtering device for use by the distributor that contains a filtering expression for testing a value of an argument contained in the generated message, wherein the filtering expression is created at run time; and
   a transmitting device for transmitting the message if a result of the filtering expression is true.

2. The system of claim 1 wherein the distributor compiles each filtering device, wherein the filtering device is a filtering program, the filtering program is programmed in a programming language that can be compiled.

3. The system of claim 2 wherein the distributor dynamically loads the compiled filtering program before executing the filtering expression in the filtering program.

4. The system of claim 2 wherein the filtering program includes a test implement in one of a Boolean statement and a SQL statement.

5. The system of claim 2 wherein the filtering program includes a programming expression that performs queries on one of an individual message and a group of messages.

6. A method for distributing characterizing information from a distributor of a computer network system, the method comprising the steps of:
   A) receiving a message that indicates an anamoly on a network device;
   B) compiling a filtering program that is associated with the message;
   C) filtering the message in accordance with the filtering program by testing an argument value in the message in accordance with a filtering expression of the filtering program wherein the filtering expression is created at run time; and
   D) distributing the filtered message if a result of the filtering expression is true.

7. The method of claim 6 wherein the step B of compiling comprises the steps B2 of writing and compiling the filtering program in a language similar to that of the distributor.

8. The method of claim 7 wherein the step B2 of compiling further comprises the steps B3 of:
   dynamically loading the compiled filtering program; and
   executing the filtering expression.

9. The method of claim 6 wherein the step A further comprises the step A1 of dynamically altering the filtering program during run time in response to the anomaly.

10. A node for carrying out the method according to claim 6.

11. A computer-readable medium comprising the comprising: instructions and data written on said computer readable medium, said instructions and data containing information for the practice of the method of claim 6.

12. Electromagnetic signals travelling over a computer network comprising: said electromagnetic signals carrying information for the practice of the method of claim 6.

13. A distributed computer network system adapted to characterize information for distribution, the system comprising:
   a distributor that receives a message from a network device, the message containing a value of an argument, the distributor testing the value of the argument in accordance with a filtering expression to thereby distribute the message if a result of the filtering expression is true; and
   a filtering device that creates the filtering expression at run time.

14. A distributed computer network system comprising:
   a distributor for receiving at least one message that indicates an anamoly on a network device;
   a means for compiling a filtering program that is associated with the at least one message;
   a filtering device for use by the distributor to test a value of an argument contained in the message, wherein the filtering program is created at run time; and
   a means for distributing the message if a result of the filtering program is true.

15. A method for distributing information from a distributor of a computer network system, the method comprising the steps of:
   receiving a message into the distributor that indicates an anamoly on a network device;
   filtering the message through by a filtering program that contains a filtering expression for testing a value of an argument contained in the message, wherein the filtering expression is created at run time; and transmitting the message through a transmitting device if a result of the filtering expression is true.

16. A computer in a network comprising:
- a distributor software application on said computer for receiving at least one message that indicates an anamoly on a network device;
- a means for compiling a filtering program that is associated with the at least one message;
- a filtering device for use by the distributor to test a value of an argument contained in the message, wherein the filtering program is created at run time; and
- a means for distributing the message if a result of the filtering program is true.

17. A packet switching communication network comprising at least one node according to claim 16.

18. A method in a computer for distributing information, comprising receiving a message into a distributor software application, said message indicating an anamoly on a network device;
- filtering the message by a filtering program that contains a filtering expression for testing a value of an argument contained in the message, wherein the filtering expression is created at run time; and
- transmitting the message through a transmitting device if a result of the filtering expression is true.

* * * * *